Patented May 11, 1926.

1,583,902

UNITED STATES PATENT OFFICE.

HARRY GEORGE SCHURECHT, OF PITTSBURGH, PENNSYLVANIA, ASSIGNOR OF ONE-HALF TO HENRY THOMAS SHELLEY, TRUSTEE, OF PHILADELPHIA, PENNSYLVANIA, AND ONE-HALF TO GEORGE CASPER DOERING LENTH, TRUSTEE, OF CHICAGO, ILLINOIS.

SALT GLAZING.

No Drawing. Application filed July 23, 1924. Serial No. 727,716.

This invention relates to salt or vapor-glazing of ceramic ware. This method of glazing, as commonly employed, consists in introducing common salt, sodium chloride, into the kiln or furnace containing the ware, during the later stages of the burn, either by throwing it upon the fires or introducing it directly into the kiln; and the salt, which is thereby volatilized and probably dissociated, combines with the body of the ware to form a glaze on its surface. This method of glazing is applicable over a wide range of ceramic manufacturing processes including the production of sewer pipe, stoneware, brick, wall coping, silo block, etc. So far as I am aware sodium chloride is the salt universally employed in this connection.

I have discovered that chlorides of the other common alkali metals, potassium and lithium, can be substituted in whole or in part for the sodium salt, and produce glazes not only as good as, but better than sodium chloride alone.

As disclosed in my copending application Serial No. 727,715 filed concurrently herewith I have found that the addition of from 1 to 10% of a volatile zinc compound, as for example zinc chloride to the alkali chloride base greatly improves the quality of the glaze. This is true of potassium chloride and lithium chloride glazes as well as those using sodium chloride as a base.

I have found that not only can the chlorides of potassium and lithium be employed alone but that the following mixtures in parts by weight are satisfactory:

|  | Parts. |
|---|---|
| Potassium chloride | 100 |
| Zinc chloride | 2 |
| Sodium chloride | 50-95 |
| Potassium chloride | 50- 5 |
| Sodium chloride | 50-95 |
| Potassium chloride | 50- 5 |
| Zinc chloride | 2 |

|  | Parts. |
|---|---|
| Lithium chloride | 100 |
| Zinc chloride | 2 |
| Sodium chloride | 56-95 |
| Lithium chloride | 44- 5 |
| Sodium chloride | 56-95 |
| Lithium chloride | 5-44 |
| Zinc chloride | 2 |
| Sodium chloride | 50-90 |
| Potassium chloride | 25-5 |
| Lithium chloride | 25-5 |

These compositions are introduced into the kiln by any of the usual methods. I have obtained satisfactory results by introducing them into the kiln when the temperature of the latter is about 1100° C.

I claim:

1. A salt-glazing composition comprising potassium chloride and sodium chloride.

2. A salt-glazing composition comprising lithium chloride and potassium chloride.

3. A salt-glazing composition comprising potassium chloride, sodium chloride and lithium chloride.

4. The method of salt-glazing ceramic ware which comprises volatilizing potassium chloride in a kiln containing the ware during the burning thereof.

5. The method of salt-glazing ceramic ware which comprises volatilizing lithium chloride in a kiln containing the ware during the burning thereof.

6. A salt-glazing ceramic product glazed by volatilizing potassium chloride in a kiln containing the ware during the burning thereof.

7. A salt-glazing ceramic product glazed by volatilizing potassium chloride in a kiln containing the ware during the burning thereof.

In testimony whereof I affix my signature.

HARRY GEORGE SCHURECHT.

Certificate of Correction.

It is hereby certified that in Letters Patent No. 1,583,902, granted May 11, 1926, upon the application of Harry George Schurecht, of Pittsburgh, Pennsylvania, for an improvement in "Salt Glazing," an error appears in the printed specification requiring correction as follows: Line 86, claim 7, for the word "potassium" read *lithium;* and that the said Letters Patent should be read with this correction therein that the same may conform to the record of the case in the Patent Office.

Signed and sealed this 15th day of June, A. D. 1926.

[SEAL.]

M. J. MOORE,
*Acting Commissioner of Patents.*